(12) United States Patent
Alink (10) Patent No.: US 9,623,926 B2
(45) Date of Patent: Apr. 18, 2017

(54) WALKER DEVICE WITH SITTING ASSEMBLY

(71) Applicant: Barbara Elisabeth Alink, Richmond (CA)

(72) Inventor: Barbara Elisabeth Alink, Richmond (CA)

(*) Notice: Subject to any disclaimer, the term of this patent is extended or adjusted under 35 U.S.C. 154(b) by 12 days.

(21) Appl. No.: 14/396,160

(22) PCT Filed: Jan. 10, 2013

(86) PCT No.: PCT/NL2013/050011
§ 371 (c)(1),
(2) Date: Oct. 22, 2014

(87) PCT Pub. No.: WO2013/162354
PCT Pub. Date: Oct. 31, 2013

(65) Prior Publication Data
US 2015/0076797 A1   Mar. 19, 2015

Related U.S. Application Data

(60) Provisional application No. 61/637,816, filed on Apr. 24, 2012.

(30) Foreign Application Priority Data

Jan. 4, 2013 (NL) ..................................... 2010082

(51) Int. Cl.
*B62J 1/10* (2006.01)
*B62J 1/00* (2006.01)
(Continued)

(52) U.S. Cl.
CPC ................ *B62J 1/005* (2013.01); *A61H 3/04* (2013.01); *B62J 1/10* (2013.01);
(Continued)

(58) Field of Classification Search
CPC ... B62K 5/05; B62K 5/08; B62K 5/10; B62K 15/008; A61H 3/04; B62J 1/10; B62B 3/12
See application file for complete search history.

(56) References Cited

U.S. PATENT DOCUMENTS

| 679,561 | A | * | 7/1901 | Hircock | ................... B62K 5/08 280/267 |
| 1,373,814 | A | * | 4/1921 | Hemington | ............ B62K 3/002 280/87.05 |

(Continued)

FOREIGN PATENT DOCUMENTS

| DE | 3704672 A1 | 8/1988 |
| DE | 3720368 A1 | 1/1989 |

(Continued)

OTHER PUBLICATIONS

Machine Translation of DE 37 20368, processed Sep. 8, 2016, through the Espacenet webpage <https://worldwide.espacenet.com>.*

(Continued)

*Primary Examiner* — J. Allen Shriver, II
*Assistant Examiner* — Brian Cassidy
(74) *Attorney, Agent, or Firm* — Harness, Dickey & Pierce, P.L.C.

(57) ABSTRACT

A walker device is disclosed including an overarching frame with an overarching top, and a sitting assembly coupled to the frame. The frame extends at least primarily in a first direction between a front side with at least two front wheels and a rear side with a first rear wheel. The frame includes a rear frame part and a middle frame part. The rear frame part includes a height allowing a user to walk over the rear frame part and take place on the sitting assembly. The middle frame part includes a width allowing a user to place his or her legs on either side of the middle frame part. The sitting (Continued)

assembly suitably includes a hinge with a saddle pad for a transition between a first state and a second state.

17 Claims, 6 Drawing Sheets

(51) Int. Cl.
  *A61H 3/04* (2006.01)
  *A61H 3/00* (2006.01)
(52) U.S. Cl.
  CPC .......... *A61H 2003/006* (2013.01); *A61H 2201/0161* (2013.01); *A61H 2201/1633* (2013.01); *F04C 2270/0421* (2013.01)

(56) References Cited

U.S. PATENT DOCUMENTS

| | | | | |
|---|---|---|---|---|
| 1,404,274 | A * | 1/1922 | Cooper | B62K 9/02 280/1.21 |
| 1,668,623 | A * | 5/1928 | Avril | B62K 3/002 280/87.021 |
| 2,423,590 | A * | 7/1947 | Fageol | B23K 7/004 16/21 |
| 3,059,943 | A * | 10/1962 | Rich | B62K 9/02 280/87.021 |
| 3,561,778 | A * | 2/1971 | La Brie | B62K 5/10 280/12.14 |
| 3,992,024 | A * | 11/1976 | Workman | A61G 5/00 280/87.041 |
| 4,079,957 | A * | 3/1978 | Blease | B62K 13/00 280/278 |
| 4,239,248 | A * | 12/1980 | Ewers | A61G 5/02 280/270 |
| 4,277,078 | A * | 7/1981 | Root | B62K 5/05 280/269 |
| 4,384,713 | A | 5/1983 | Deutsch et al. | |
| 4,469,344 | A * | 9/1984 | Coil | B62K 5/05 280/269 |
| 4,740,004 | A * | 4/1988 | McMullen | B62K 5/05 280/124.103 |
| 4,863,183 | A * | 9/1989 | Hwang | B62K 5/05 180/210 |
| 4,917,396 | A * | 4/1990 | Meneses | B62K 5/08 224/415 |
| 5,158,313 | A * | 10/1992 | Becker | A61H 3/04 135/67 |
| D357,215 | S * | 4/1995 | Cummings | B60G 21/007 D12/112 |
| 5,762,351 | A * | 6/1998 | SooHoo | B60G 21/007 180/210 |
| 5,909,889 | A * | 6/1999 | Larson | B62K 5/02 280/229 |
| 6,149,170 | A * | 11/2000 | Dotson | A61H 3/04 280/267 |
| 6,161,860 | A * | 12/2000 | Corneau | A61H 3/04 135/67 |
| 6,270,103 | B1 * | 8/2001 | Grimm | B62K 25/005 280/270 |
| 6,367,824 | B1 * | 4/2002 | Hayashi | B62K 5/05 280/124.103 |
| 6,419,254 | B1 * | 7/2002 | Langen | B62K 3/10 192/217.4 |
| 6,588,787 | B2 * | 7/2003 | Ou | B62K 15/008 180/220 |
| 6,675,820 | B2 * | 1/2004 | Balan | A61H 3/008 135/67 |
| 6,817,617 | B2 * | 11/2004 | Hayashi | B62K 5/05 280/124.1 |
| 6,953,203 | B2 * | 10/2005 | Wilcox | B62K 3/005 280/282 |
| 7,073,806 | B2 * | 7/2006 | Bagnoli | B62K 5/05 180/210 |
| 7,182,352 | B1 * | 2/2007 | Gonzalez | A63C 3/04 280/28.11 |
| 7,287,767 | B1 * | 10/2007 | Gomes | B62K 3/16 280/87.021 |
| 7,290,780 | B2 * | 11/2007 | Hsu | B62K 15/008 280/278 |
| 7,311,319 | B1 | 12/2007 | Ortega | |
| 7,527,276 | B2 * | 5/2009 | Schmautz | B62J 25/00 280/200 |
| 7,708,291 | B1 * | 5/2010 | Henderson | B62D 9/02 280/124.103 |
| D618,140 | S * | 6/2010 | Sanderson | B60G 21/007 D12/130 |
| 7,780,180 | B2 * | 8/2010 | Hoepner | A61H 3/04 280/263 |
| 7,909,340 | B2 * | 3/2011 | Henderson | B62D 9/02 280/124.103 |
| 7,926,828 | B2 * | 4/2011 | Merchant | B62K 9/02 280/282 |
| 8,016,302 | B1 * | 9/2011 | Reeve | B62K 5/05 280/124.103 |
| D650,724 | S * | 12/2011 | Chiang | B60G 21/007 D12/111 |
| 8,231,133 | B2 * | 7/2012 | Walther | B62K 5/023 280/47.35 |
| D668,586 | S * | 10/2012 | Golias | B60G 21/007 D12/111 |
| 8,523,213 | B2 * | 9/2013 | Raphael | B62K 5/02 280/278 |
| 8,608,184 | B2 * | 12/2013 | Janis | A61H 3/04 280/87.021 |
| 8,632,088 | B2 * | 1/2014 | Yerdon | B62K 5/05 280/221 |
| RE44,854 | E * | 4/2014 | Henderson | B62K 5/08 280/124.103 |
| 8,827,284 | B2 * | 9/2014 | Walther | B62K 5/023 280/87.041 |
| 8,857,832 | B2 * | 10/2014 | Smith | B62K 21/16 280/263 |
| 8,991,845 | B2 * | 3/2015 | Chong | B62K 3/02 280/259 |
| 9,174,693 | B2 * | 11/2015 | Godlewski | B62K 9/02 |
| 9,227,684 | B2 * | 1/2016 | Smith | B62K 5/003 |
| 9,289,077 | B1 * | 3/2016 | Gyasi | A47D 13/04 |
| D753,553 | S * | 4/2016 | Alink | B60G 21/007 D12/112 |
| 9,321,507 | B2 * | 4/2016 | Dodds | B62M 1/14 |
| 2005/0230933 | A1 * | 10/2005 | Woo | B62K 15/008 280/278 |
| 2006/0244231 | A1 * | 11/2006 | Rogers | A61G 5/00 280/87.051 |
| 2007/0085298 | A1 * | 4/2007 | Balajadia | B62K 5/05 280/282 |
| 2007/0182116 | A1 * | 8/2007 | Davey | B62K 3/16 280/87.05 |
| 2007/0277641 | A1 * | 12/2007 | Versey | B62K 21/12 74/551.4 |
| 2008/0303243 | A1 * | 12/2008 | Ying | B62K 15/008 280/287 |
| 2009/0194142 | A1 * | 8/2009 | Zimmerman | A61H 3/04 135/67 |
| 2011/0031716 | A1 * | 2/2011 | Taylor | B62K 5/05 280/259 |
| 2011/0181014 | A1 * | 7/2011 | Ryan | B62K 15/008 280/263 |
| 2013/0341884 | A1 * | 12/2013 | Raphael | B62K 5/02 280/259 |
| 2015/0076797 | A1 * | 3/2015 | Alink | A61H 3/04 280/647 |

FOREIGN PATENT DOCUMENTS

| | | |
|---|---|---|
| DE | 9015563 U1 | 2/1991 |
| DE | 9206417 U1 | 10/1992 |
| DE | 29800585 U1 | 3/1998 |
| DE | 102004020989 A1 | 7/2005 |

(56) References Cited

FOREIGN PATENT DOCUMENTS

| FR | 2902317 A1 | 12/2007 |
| FR | 2959663 A1 | 11/2011 |
| JP | 1033606 | 2/1998 |
| JP | 20040105396 | 4/2004 |
| WO | WO-2004005123 A1 | 1/2004 |
| WO | WO-2004047712 A2 | 6/2004 |
| WO | WO-2007056508 A2 | 5/2007 |

OTHER PUBLICATIONS

International Search Report PCT/ISA/210 for PCT/NL2013/050011 dated Jun. 2, 2013.
Brochure which contains the advertisement of running 3-wheeler dated 2007 and English language translation thereof.

* cited by examiner

WALKER DEVICE WITH SITTING ASSEMBLY

CROSS-REFERENCE TO RELATED APPLICATIONS

This Application in the U.S. National Phase Application of PCT Application No. PCT/NL2013/050011 filed on Jan. 10, 2013, which claims priority to Netherlands Patent Application No. 2010082 filed on Jan. 4, 2013 and U.S. Provisional Patent Application No. 61/637,816 filed Apr. 24, 2012.

TECHNICAL FIELD

The present invention relates according to a first aspect to a walker device. According to another aspect the present invention relates to a sitting assembly designed for use on a vehicle. According to still another aspect the present invention relates to the use of the present walker device.

BACKGROUND ART

The technical field of walker devices comprises several types of walker devices. A first and main category of walker devices are walkers wherein the user walks behind the walker. This is a type commonly in use by elderly people with reduced body stability that are afraid of falling in the course of walking.

A second category of walker devices are wheelchair type walker devices. An example hereof is for instance known from JP-2004-105396. This type comprises a frame extending on three sides of an inner space, in which a sitting assembly, such as a saddle, is located. The saddle pad is oriented with its front side at the open side of the frame. This type is not really intended for walking around independently. The frame structure however allows that the walker is pushed when a person is seated on the saddle. Its application is particularly as a medical and/or revalidation aid.

A third category of walker devices are supporting frames used to support a user to rise from a sitting posture to a standing posture. WO2007/056508 describes an example hereof. Disclosed is a walker having a main support frame, a superstructure and a body support means. The body support means is secured to the superstructure frame and operatively arranged to support the user. The walker may include four wheels.

The invention relates particularly to the first category of walkers and is provided with a sitting assembly. Such a combination is merely known in an implementation wherein a user should turn 180 degrees for arriving at the rest state—i.e. sitting assembly—from the state wherein he or she can walk behind the walker.

An example of a walker belonging to the first category of walkers is DE 10 2004 020 989, describing a foldable conventional walker on wheels wherein the user can walk behind the walker and support on the handles. The folding transforms the walker into a rolling bag, which may be drawn by the user. The walker is further provided with a sitting space to rest. This is a rectangular plate, which further would be suitable for placing luggage or as a sitting space for a child. It is quite small and uncomfortable for elderly people. Moreover, when the primary user of the walker would to sit, he or she first has to turn himself or herself around, i.e. 180 degrees. However, such turning is not easy for an elderly person that is less mobile.

A further example is disclosed in JP-A 10-033606, disclosing a walker having sitting means wherein the sitting means is arranged in the opposition direction of the handles. The sitting means are thus intended to rest when the walker is not pushed forward by the user. However, it is typically hard for less mobile persons to turn 180 degrees between the walking position and such a rest position Further, U.S. Pat. No. 4,384,713 describes a rolling walker comprises a walker frame with four legs and wheels, wherein lockable front wheels can be disengaged by hand controls.

In addition to the turning problem, currently available walkers have more drawbacks. In fact, currently available walkers are devices which design has not substantially changed in the last thirty years. The design has drawbacks and principle flaws that pose problems for the users.

For example, the user is not attached to the walker, so when the walker accelerates (i.e. down a slope), creating a distance between walker and user, causing the user to lean forward and ultimately fall.

Further, when losing control of the device, the user would need to find the brakes. Currently most brakes are handles that would need to be grabbed, which requires, when in panic, an anti-intuitive action. When in panic, the user clinches their hands in search for support, the walker separates further from the user, ultimately causing the user to fall. In the US alone there are 40,000 reported cases of incidents with walkers/walking aids per year.

In Canada approximately half of the people who should use some kind of mobility aid are not using available devices due to the stigmatizing character attached with the use of these.

With regard with the walking position, current walkers have the disadvantage that the user has to bend forward, leaning on the handles to find support. This does not promote a healthy posture since users have an arched back and walk hunched over. Further, walkers also require the user to carry their complete body weight when walking, a challenge and risk for brittle osteoporosis patients.

In case a conventional walker has sitting means, they generally can only be used to rest. The user needs to rotate 180 degrees between the handle bars, which may be a challenge to balance.

Accordingly, a problem of the current available walkers is that they are intended for sitting, or for walking.

SUMMARY OF INVENTION

Regarding the above disadvantages of the conventional walker, there is a need in the art for a walker which solves the related problems.

The objective of the present invention is, amongst other objectives, to provide a walker device which solves the above mentioned problems.

It is a more specific object of the invention to provide an improved walker device enabling the user to a combination of sitting and walking.

It is a further object to provide an improved method of assisted walking, on the basis of said improved walker device.

This objective, amongst other objectives, is met by providing a walker device according to the appended claim 1.

Specifically, this objective, amongst other objectives, is met by providing a walker device comprising an overarching frame with an overarching top, and a sitting assembly coupled to said frame, which frame extends at least primarily in a first direction between a front side with at least two front wheels and a rear side with a first rear wheel. The overarching frame particularly comprises, when seen along the first direction, a fore frame part located before said overarching top, a middle frame part located between said overarching top and the sitting assembly, and a rear frame part located behind the sitting assembly to which the rear wheel is connected, wherein the rear frame part has a height allowing a user to walk over the rear frame part and take place on the sitting assembly, and wherein the middle frame part has a width allowing a user to place his or her legs on either side of the middle frame part.

With the walker device according to the present invention, a new subclass of the first category of walker device is provided enabling a new mode of transportation which is not limited to the disadvantages of the above described categories of conventional walkers. The walker device according to the invention both enables and supports movement of the user wherein the user combines sitting with walking and/or running.

The present invention provides a device which offers users an ability to move in a new way, combining sitting with walking and/or running. It is a new mode of transportation and not limited to offering an alternative for current walkers. The user mounts on top of the device so the body is resting on and in contact with the device, not just via the handles. The overarched frame allows for the legs to move freely without any obstruction between the lower legs. The user mounts over the saddle, particularly a fold-up saddle, which when collapsed is narrow and allows easy access. After mounting, the user may lever the saddle pads up and sits down, fully supported. Body weight is now supported by the saddle, so joints and muscles are not burdened, while the device allows complete movement, either walking or even running, all movements being safely controlled by the user.

The term 'overarching frame' as used in the present context means that the frame overarches legroom for the user between the present front wheels and first rear wheel. The terms 'front frame part', 'middle frame part' and 'rear frame part' are intended to describe the shape of the frame and do not need to be individual construction elements. Rather, it appears suitable that the overarching frame is—at least substantially—a single construction element. Moreover, the term 'overarching top' is used for expression of a highest area of the frame, which highest area does not need to be a single point, but could extend in the first direction, similar to a bridge.

The present walker device can advantageously be used for walking and/or running while sitting. The user therefore does not need to bend forward, but is supported by the sitting assembly, and typically also his or her own legs. The overarching frame provides legroom to the legs, while a user sits on the sitting assembly. The orientation of the sitting assembly is towards the front side of the walker device, so that a user does not need to turn 180 degrees. Moreover, the walker device is designed so as a user can easily get onto the device and get off the device. First, the present rear frame part allows the user to approach the walker device from behind by walking over the rear frame part, until the sitting assembly is placed behind the legs of the user. Since the rear frame part is sufficient low, the user is not forced to lift his legs over the overarching frame.

Further, in a second step the user mounts on top of the walker device on the sitting assembly. Most suitably, use is made herein of a saddle that is removable, foldable, rotatable or the like, so that the saddle does not hinder the user when mounting on the walker device. Then, once the sitting assembly is behind the person, the user brings the sitting assembly with suitable means from a first state to a second state, in which the user can sit on the saddle. A user can slightly bend the knees and immediately rest the body on and in contact with the walker device. Thus the present walker device supports the user therewith avoiding burdening of joints and muscles. It also stabilizes users with balance problems or degenerative conditions like Parkinson or MS.

In a third step, the user may start walking while continuing to be seated on the sitting assembly. The user could even be running, since the overarching frame enables enough legroom for this purpose. Thus, the present walker device enables walking while its body is supported. Hereby the radius of action of user which are fit enough to walk is further improved, since its body weight is supported by the present walker device.

In a fourth step, the user may stop the walker device. Brakes are suitably present thereto, although in principle this is not required: the user may stop the device with his feet. The rolling resistance may be set so as that the device will easily and immediately stop. It is furthermore expected that the device in a further embodiment may comprise sensors for sensing speed, leg movement and/or leg position, and on the basis of the sensing, automatically activate brakes and/or increase rolling resistance. These governors will be optional depending on user needs.

In a fifth step, after stopping the present walker device, the user may stand up in a natural way while the present walker device remains stabile due to its at least two front wheels and one rear wheel and thus provides further support to the hands of the user, if desired.

Most suitably, the walker device of the present invention comprises a specific sitting assembly, which simplifies the second step even further. Accordingly, such a sitting assembly is movable relative to the overarching frame by means of pivoting, rotating or extension. Particularly, the device is equipped with a foldable/collapsible saddle, allowing mounting over the rear-end of the walker with minimum obstruction. Two seating pads can be levered into the position to form a saddle on which, after levering the pads into the upright position, the user sits down on.

According to this embodiment, the sitting assembly comprises a saddle coupled to a movement means, for instance a hinging means, such that a user may bring the saddle from a first state to a second state, in which first state a user may get onto the vehicle and above the saddle, in which second state the saddle is locked and in a position to support a user. This sitting assembly allows a user to easily bring his or her body in position above the sitting assembly, without having to lift a leg. When the body of the user is brought above the sitting assembly, the user may bring the saddle to a state wherein the saddle is suitable to support the body weight of the user. Most suitably, means are present so that a user can choose when such movement of the saddle occurs. The said means may be for manual operation (for instance a handle or lever or hydraulic switch) or for motorized operation.

The said movement means is most preferably a hinging mechanism. Herewith the movement of the sitting assembly is a rotating movement. Such a rotating movement is a feasible manner of bringing the saddle below the back of the user. When made fit for a particular user, it may be achieved that the saddle is in contact with the user's body already during the last portion of said rotating movement. A further advantage is that a user could ensure the transition for the first state to the second state manually, i.e. by operation of a lever, which is handily arranged in front of the sitting assembly and thus in front of the user.

Alternatively, or additionally, use could be made of a translation, i.e. a saddle pin extending upwards and/or downwards. Obviously, the length of the saddle pin may be set and fixed prior to use, but can be extended with optional hydraulic saddle pin. However, the saddle pin could further be used in combination with a motor. Moreover, it may be advantageous that the saddle just goes downwards, when a user wants to leave the walker device. This could be implemented with a motor, but alternative implementations are feasible. For instance a button coupled to a spring and/or locking means could be present.

In an advantageous embodiment, the saddle comprises a first and a second saddle pad. The saddle pads may be exchangeable and can be custom fitted for the specific needs of the user. The saddle pads support the sitting bones, but do not excerpt pressure on the prostate (men) or private sensitive front parts (women) that saddles normally do. The pads are supporting exactly where they need to support, on the sitting bones, not on soft, sensitive parts where regular bicycle saddles are detrimental and uncomfortable. More particularly, the first and second saddle pads may be movable, and particularly rotatable in accordance with a hinging mechanism. Therewith, a sitting assembly is obtained with high robustness, while a user may still walk over the saddle. During mounting of the sitting assembly, the saddle pads are hanging down and the sitting assembly is very narrow, allowing the user to just pull the saddle between the legs, without having to lift up a leg at all.

Thereafter, when the person is behind the saddle, the user will use said means as discussed above to rotate the saddle pads upwards and bring the sitting assembly from the first state into its second state.

In the first state of the sitting assembly, the first and the second saddle pad are oriented downwards, for instance vertical, or including an angle between 0 and 45 degrees to a vertical axis. In the second state, the first and the second saddle pad are oriented substantially horizontally, or even upwards, so as to include mutually an angle of between 150 and 180 degrees. A structural advantage of this implementation is that there is no need for movement of the saddle pin of the sitting assembly. Functional advantages include minimizing space in the first state, and a gradual increase of support during the transition from the first to the second state.

In a specific implementation, the first and the second saddle pad rotate along an axis, during a transition from the first state to the second state or vice versa, which axis substantially extends along the first direction.

In again a further implementation, the saddle is foldable, so as to extend its width in a transition from the first to the second state.

Rather than rotating a first saddle pad and a second saddle pad, the complete saddle could be rotated, relatively to the saddle pin between the saddle and the overarching frame. In a further alternative, said saddle pin could be rotated. A combination of such options may also be applied.

The sitting assembly as herein above described, appears to be useful also for alternative walker devices, or more in general vehicles.

According to a further aspect, the present invention relates to the use of the present walker device and/or the present sitting assembly for transporting individuals while the individuals are supported by the walker device.

A suitable embodiment of the present walker device is wherein the present middle frame part is higher than the present rear frame part to provide legroom for a walking movement by the user. When the present walker device is in use, the legs of the user are substantially placed under the present middle part. Accordingly, when the middle frame part is higher than the rear frame part, this allows legroom for a walking and even running movement by the user.

Suitably, the middle frame part constitutes a 'structural block' to provide the bearing and rotation part of the steering installation. In case of the cable steering, the middle frame part may comprise, particularly in an inner space, a wheel to rotate the cable. The cable will then run through the front frame part. In case of a rigid steering mechanism, the middle frame part constitutes the structural part for the bearings of the steering.

In a further implementation hereof, the middle frame part comprises a hinge, which allows the frame to be folded for easy storage or transportation. It easily fits in the back of a car.

The present overarching frame is preferably, when seen in a side view parallel to the first direction, an elliptical overarching frame, possibly with all sorts of variations to its shape. An elliptical overarching frame may comprise a part of a circle, as well as other curvatures or sharper bends, angles. The advantage of an elliptical overarching frame is that the rear side of the walking device is low, therewith providing an easy access to the sitting assembly, and the fore part of the walking device high, therewith providing enough leg room for walking and/or running while seating of the sitting assembly.

The principle is that the frame is some form of arched-over structure without any additional connection between the rear frame part and the front frame part.

Furthermore, the present rear frame part suitably extends towards a lower end at which said wheel is located, or wherein the present first rear wheel is placed behind the body of the user for providing a stable walker device, thereby avoiding backwards falling with the walker device.

According to a preferred embodiment, the present walker device comprises an overarching frame wherein the present fore frame part has a width larger than the middle frame part. The advantage of this embodiment is that a stabile walker device is provided, both when the walker device is in use as well as when the walker device is parked.

In a suitable implementation, the present fore frame part preferably comprises a first and a second frame element, wherein the first frame element extends from the middle frame part towards a left front wheel, and wherein the second frame element extends from the rear middle frame part towards a right front wheel. This implementation provides a stable walker device since the width of the walker device is already increasing from the present middle frame part. Alternatively, the fore frame part may be a single construction element, triangulated to/mounted on the horizontal bumper, connection between the brackets holding the rotation part of the steering front wheels.

In other words, in order to provide a stable walker device, the present overarching frame, when seen in a perpendicular top view, has or encloses a substantially triangular shape, wherein its width increases from the first rear wheel to the at least two front wheels.

For reasons of stability, the present fore frame part is suitably connected with the at least two, preferably transversal arranged, front wheels via a transversal, preferably horizontal, rod which extends between the at least two front wheels. The advantage of this transversal rod is that a rigid frame is provided. Further, the present transversal rod may provide a support for the feet of the user, for example when the user is waiting of when the user is riding down a slope. The transversal rod (bumper) might also be used to rest a foot on for users recovering from lower body surgery. It also provides the structure for mounting baggage, storage space for a cane holder, prosthetic leg holder, shopping bag etc.

Preferably, the present walker device comprises supporting connector elements between the transversal, preferably horizontal, rod and the fore frame part. The advantage of these supporting connector elements is that a more rigid frame is provided.

Suitably, the present at least two, preferably transversal arranged front wheels, have a larger diameter than the first rear wheel. The advantage of larger front wheels is that the present walker device can easily handle obstructions such a curbstone.

In order to provide an easily steerable walker device, the present at least two front wheels and/or one rear wheel are advantageously swivel castors. Swivel castors are easily moveable in desired directions. Optionally, the castors are provided with locking means.

Another advantageous embodiment for a walker device providing support to the user is when the present walker device further comprises a support element at the front side, preferably mounted ad the fore frame part, that a user may grip with his or her hands.

A most commonly applied steering mechanism for this walker is by means of cables. Cable steering allows a nearly invisible steering, not causing an obstruction and limiting the movement of the legs while striding on the walker. The middle frame part houses a rotation wheel under the steering bar. The rotation wheel rotates when the steering bar is operated by user. The cables transfer the movement to the castors with the front wheels. Rigid cables may be used which can be mounted in the tubing of the frame, or, alternatively, casual brake cables may be used. With use of these cables, horizontal rods are then connecting the castors and transfer the rotation from steering bar to wheels.

In an alternative implementation, the said support element is or comprises a substantially horizontal steering bar with a mounted optional chest pad the users chest rests on, coupled to an optional swivel steering mechanism suitable to actuate the at least two front wheels, which are suitably arranged transversally, i.e. at a distance transversal from a central axis of the overarching frame. Hereby, steering is designed to be operated in an intuitive way which makes it easy to operate for users with limited upper-body strength. Steering is preferably provided by leaning the horizontal steering bar to either the right or the left, as desired. The steering bar is preferably attached to a substantially vertical swivel steering mechanism that transfers either leaning right or leaning left to turning the wheels right or left, respectively.

Preferably, the present walking device is also provided with brakes, which are suitable to slow down the walker device, and/or which are suitable to lock the walker device in a parked position. Most preferably, the brakes are activated by leaning on a pad mounted to the steering bar, an intuitive way of operating, not causing problems for users with compromised fine motor activity in their hands.

Furthermore, the rear wheel suitably has a stationary brake. The rear wheel may further or alternatively be provided with a brake to be operated to slow down and stop instantly.

According to a further aspect of the invention, a sitting assembly is provided, which is designed for use on a vehicle, provided with saddle pads coupled to a hinge, such that a user may bring the saddle pads from a first state to a second state, in which first state a user may get onto the vehicle and above the downwards hanging saddle pads, in which second state the saddle pads are locked and in a substantially horizontal position to support a user.

An advantage of the present sitting assembly is that it enables easy access to the sitting assembly since the user can walk over the saddle in the first state without having to lift a leg or stretch out the feet to stand on the ball of the feet to raise the crotch. A further advantage resides in an ergonomic support during walking. Neither movement of the hips under pressure is required, nor is any pressure on the crotch excerpted. The sitting assembly of the invention allows for natural strides due to absence of obstruction between the legs, and just support the sitting bones in the buttocks. In a suitable implementation, the hinging means of the sitting assembly comprises a lever hinging around a saddle pin of the sitting assembly. This lever allows a user to bring the saddle from the first into the second state in a manual operation. More suitably, the lever extends to the front side, so that a user can hold the lever, particularly a haft thereof, after mounting on the walker device or other vehicle.

A suitable construction thereto for instance comprises a top structure that is mounted on or near an end of a saddle pin, to which top structure the saddle or saddle pads thereof are rotatably connected. This construction has been found to meet the demands and requirements.

According to a preferred embodiment, the present saddle comprises two saddle pads suitable for supporting the buttocks of a user. The advantage of two saddle pads is that the user is supported under the buttocks, rather than having to sit on the crotch (the latter often uncomfortable and not preferred by older people, especially detrimental for men—prostates).

According to another preferred embodiment, the present lever is hinged on the saddle pin by a first and a second lever rod both acting on opposite sides of the saddle pin. The advantage of a double lever rod is that strength structure is obtained.

According to yet another preferred embodiment, the present walker device comprises the present sitting assembly.

Given the above advantageous properties of the present walker device, the present invention relates according to a further aspect to the use of the present walker device for transporting individuals while the individuals are supported by the walker device. In other words, the use of the present walker device for combining sitting with walking and/or running.

OVERVIEW OF FIGURES

These and other aspects of the invention will be further elucidated with reference to the figures, which are purely schematical, according to which.

DETAILED DESCRIPTION OF ILLUSTRATIVE EMBODIMENTS

The figures are not drawn to scale, and represent preferred examples of the invention. Equal reference numerals in different figures refer to same or corresponding elements.

Figure 1:
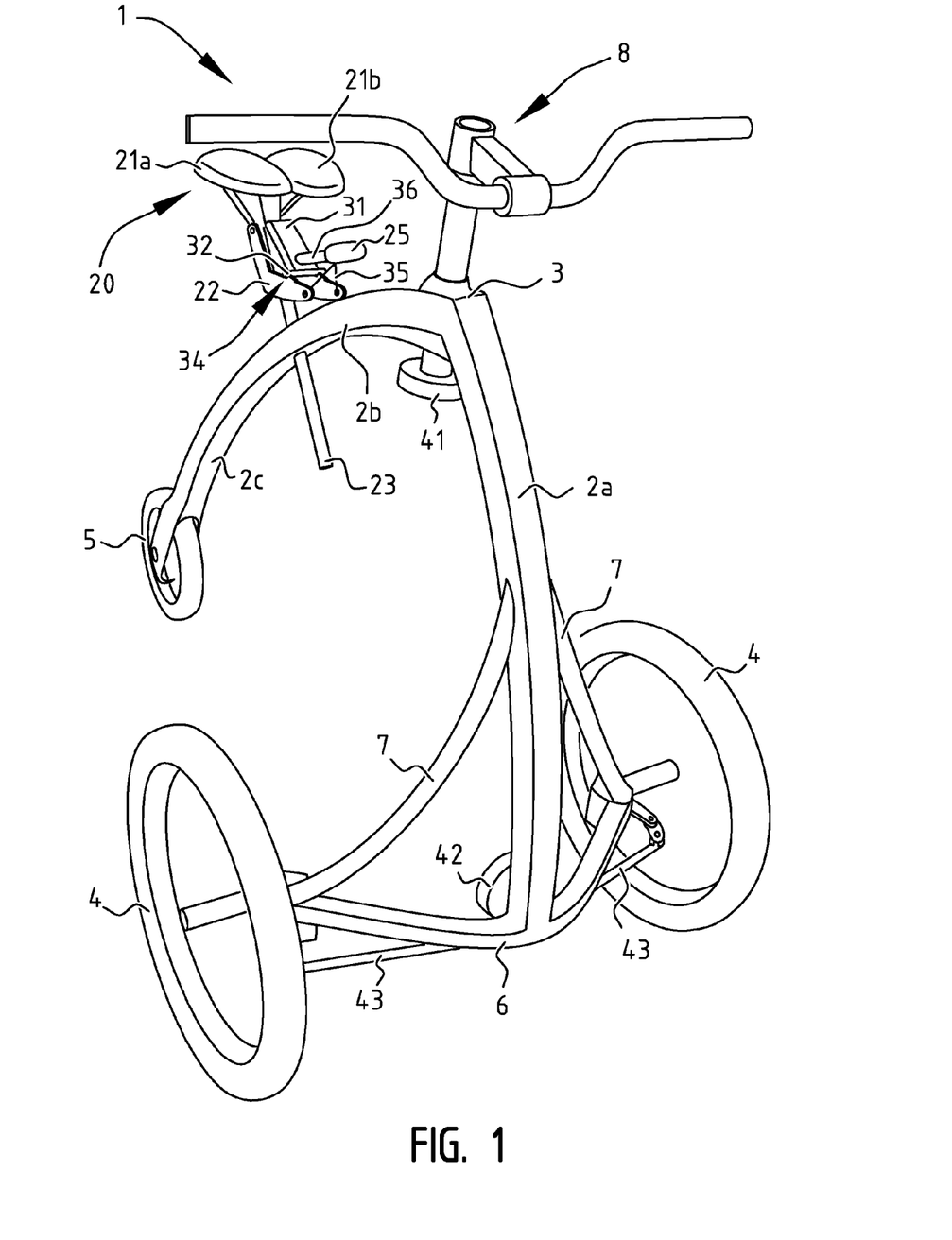
FIG. 1 is a view in perspective of a first embodiment of the present walker device, with the preferred frame structure.
Figure 2:
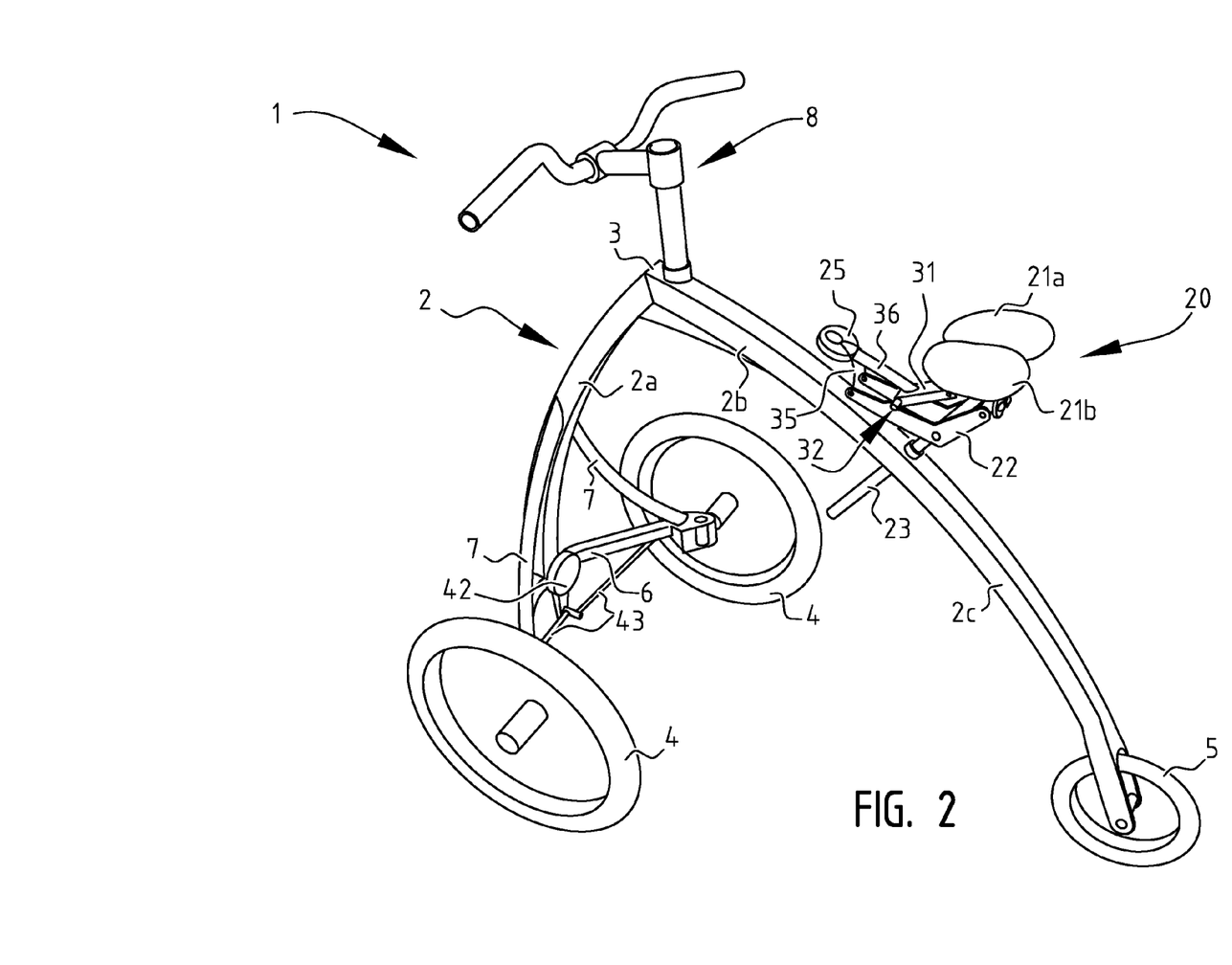
FIG. 2 is another view in perspective of the first embodiment shown in FIG. 1.

FIG. 1 shows a schematical representation of the walker device 1 in a first embodiment primarily from the front side. FIG. 2 shows a schematical representation of the same embodiment in a bird's eye view. The walker device 1 of this embodiment comprises an overarching frame 2 with an overarching top 3, and a sitting assembly 20 coupled to said frame 2. The frame 2 extends at least primarily in a first direction between a front side with at least two front wheels 4 and a rear side with a first rear wheel 5. The at least two front wheels 4 are transversally arranged, i.e. they are located at a distance from a central axis of the frame 2 along the first direction. In this embodiment, the two front wheels 4 constitute the front corners of the device. The frame 2 comprises, when seen along the first direction, a fore frame part 2a located before said overarching top, a middle frame part 2b located between said overarching top and the sitting assembly 20, and a rear frame part 2c located behind the sitting assembly 20 to which the rear wheel is connected. A support element 8 extends in this embodiment from the overarching top 3. The support element 8 comprising a steering bar, which is coupled to actuating means of the wheels in a manner known per se for a vehicle engineer, such as a bicycle construction specialist. The steering functionality is however not deemed essential for the invention; in a most simple implementation, steering functionality may be absent, and a user may achieve steering by means of his or her feet and/of slight pushing or lifting of the front frame part. In accordance with the invention, the overarching frame 2 extends from the front side to the rear side, particularly to the first rear wheel 5 and overarches a legroom for the legs of a user. The rear frame part 2c has a height allowing a user to walk over the rear frame part and take place on the sitting assembly 20. The middle frame part 2b has a width allowing a user to place his or her legs on either side of the middle frame part 2b.

In the embodiment as shown in FIG. 1, the overarching frame 2 essentially comprises two construction elements, i.e. the front frame part 2a and a combination of the middle frame part 2b and the rear frame part 2c. A hinge (not shown) may be present in the middle frame part 2b, allowing the frame to fold up and be stored or more easily transported. The width of the overarching frame 2 is substantially uniform, i.e. shaft-like. Alternative embodiments are however feasible. For instance, a double overarching frame may be chosen (as in FIG. 4). This is effectively a frame construction with a first and a second element adjacent to each other, wherein the first element extends more or less from the sitting assembly to the left front wheel and the second element extends from the sitting assembly to the right front wheel.

Figure 4:
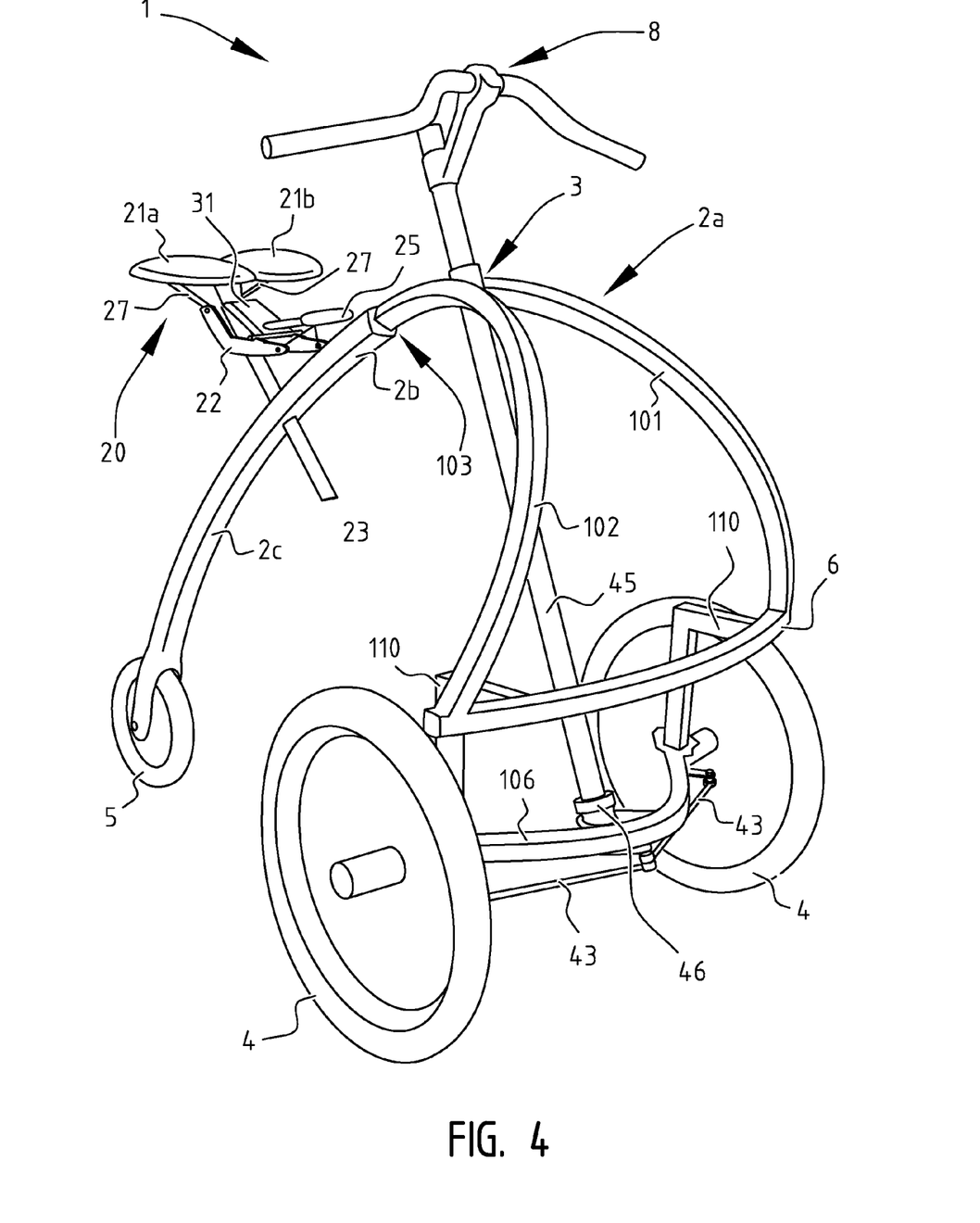
FIG. 4 is a view in perspective of another embodiment of the present walker device.

In the second embodiment of FIG. 4, the front frame part 2a comprises a first and a second frame element, extending from the middle frame part 2b. The connection point of these first and second frame elements to the rear frame element may be provided with a hinging mechanism.

The first frame element extends from the middle frame 2b part towards a left front wheel. The second frame element extends from the middle frame part 2b towards a right front wheel. The end of said first and second frame elements is however not connected directly to any of the front wheels, as can be seen in FIG. 4. Rather, a connecting rod is present between the first and the second frame element. This connecting rod is again connected to a mechanical support structure comprising a further horizontal rod and some further connecting shafts. The frame of this embodiment has, when seen in a top view, a substantially triangular shape, which is good for stability. Moreover, in this manner space is created between the first and the second frame element, which could be used for a luggage carrier. The horizontal rods in this embodiment are curved, and are suitable as a bumper. Optionally, these are thereto provided with a rubber element. The support element 8 is in this element a steering construction that is provided with a separate shaft.

The sitting assembly 20 implemented in the first embodiment is provided with two saddle pads 21 coupled to a hinge 22, such that a user may bring the saddle pads 21 from a first state to a second state. In the first state, a user may get onto the vehicle and above the hanging down saddle pads. In the second state, the saddle pads are locked and in a substantially horizontal position to support a user. Hereby, the present walker device 1 provides an easy access to the user, since the saddle pads 21 are in a downwards orientation (FIG. 3B), when the sitting assembly 20 is in its first state. This downward arrangement of the saddle pads allows the user to walk by the saddle pads without lifting his or her legs. Accordingly, elderly have an access to the walking device without performing risky caprioles.

Figure 3A:
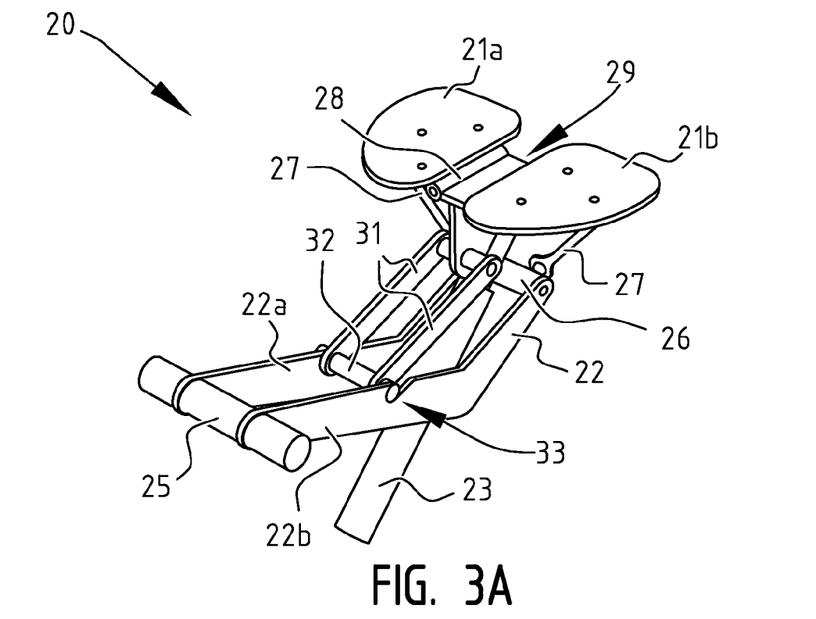
FIG. 3A and FIG. 3B are a perspective view of the present sitting assembly.

When the user is situated above the sitting assembly 20, he can bring the sitting assembly into the second state. Then, the saddle pads are brought to a substantially horizontal position allowing the user to sit on the sitting assembly 20 (FIG. 3A). Since the sitting assembly 20 comprises two independent saddle pads 21, the user is supported on its buttocks instead of its crotch, thereby providing a more comfortable position. Further, the present walking device 1 with sitting assembly 20 allows the user to sit while moving forward or backward by using the legs. The overarching frame 2 provides the user enough room to move its legs for moving, while its body weight is supported by the sitting assembly 20 and walking device 1.

As is apparent from the FIGS. 1, 2 and 4, the sitting assembly 20 is coupled with a saddle pin 23 to the overarching frame 2. This saddle pin 23 suitably extends backwards in space. This is very advantageous so as to create sufficient distance between the saddle pad 21 and the support element 8 at the front side. Moreover, this results in a walker device, wherein the saddle pad 21, when in the sitting state, is suitably at a height substantially equal or lower than the overarching top 3. Most suitably, as shown in the said figures of the first and the second embodiment, the saddle pin 23 extends at least largely perpendicular from the overarching frame 2. This is deemed beneficial from a construction perspective. While not indicated in the figures, it is not excluded that further supporting shafts may be coupled between the overarching frame 2 and the sitting assembly 20.

Further is shown in FIGS. 1, 2 and 4, that in use the first rear wheel 5 is placed behind the body of the user for providing a stabile walker device as well as narrow mounting/walk-over access. When the user is situated on the sitting assembly 20, the weight of the user is distributed by the overarching frame 2 towards both the rear wheel 5 and front wheels 4, thereby providing a stabile configuration, which avoids falling backward or forward.

Further is shown in FIGS. 1 and 2 that the fore frame part 2a is connected with the at least two transversal arranged front wheels 4 via a transversal, preferably horizontal, 'bumper'/rod 6 which extends between the at least two transversal arranged front wheels 4. This results in a rigid connection between the overarching frame 2 and the front wheels 4, thereby providing a stabile walking device 1. Further are shown supporting connector elements 7 between the transversal, preferably horizontal, rod 6 and the fore frame part 2*a*. These connector elements 7 contribute to the rigidity of the present walking device 1. Elements 7 can also house the rigid steering cables in this option of a nearly invisible steering mechanism.

In the embodiment shown in FIG. 4, the front frame part 2*a* comprises a first and a second frame element 101, 102. The first and second frame element 101, 102 are connected to a rear portion at the connection point 103. This connection point is located within the frame middle part 2*b* between the sitting assembly 20 and the top 3 of the overarching frame. The connection point 103 comprises most suitably a hinging mechanism.

The first and second frame elements 101, 102 are mutually coupled at the front side by means of the connecting rod 6. This rod 6 also has a bumper function and may be provided with a rubber-elastic material so as to improve elasticity. Whereas the connecting rod 6 of the first embodiment shown in FIGS. 1 and 2 provided a direct connection to the front wheels 4, the rod 6 of this embodiment is particularly relevant for stability and robustness. Moreover, this rod 6 may be placed more at the front side of the walker, therewith creating space for an additional luggage container or the like at the front side. The rod 6 is coupled to a second connecting rod 106 via one or more connecting structures 110. Alternative implementations wherein either one of the—first—and second connecting rods 6, 106 would be left out, may well be elaborated by a skilled person.

In the embodiment shown in FIGS. 1 and 2, the steering bar 8 is coupled to the front wheels 4 via a cable mechanism. The cable is hidden within the frame, particularly the fore frame part 2*a* and the middle frame part 2*b*, extending between a first rotating wheel 41 and a second rotating wheel 42. The first rotating wheel 41 is coupled to or present within the frame middle part 2*b*. It transforms movement of the steering bar 8 into cable movement. The second rotating wheel 42 transfers movement of the cable into movement of the steering connector rods 43 coupled to the front wheels 4.

In the embodiment shown in FIG. 4, an alternative steering mechanism is used. In this FIG. 4, a first and second frame element 101, 102 are used. Therefore, the movement of the steering bar 8 is less easily transferred to the wheels by means of a cable. A solution is found in the use of a shaft 45 and a steering arm 46 coupled thereto at a bottom side. The shaft 45, or more preferably a shaft hidden in a fixed encapsulation, transfers the rotation of the steering bar 8 to the steering arm 46. This steering arm is coupled via the connector rods 43 to the front wheels. This steering mechanism fits well with the double arched frame with the first and second frame element 101, 102, since the shaft 45 may be supported between the first and second frame elements 101, 102.

Figure 5:
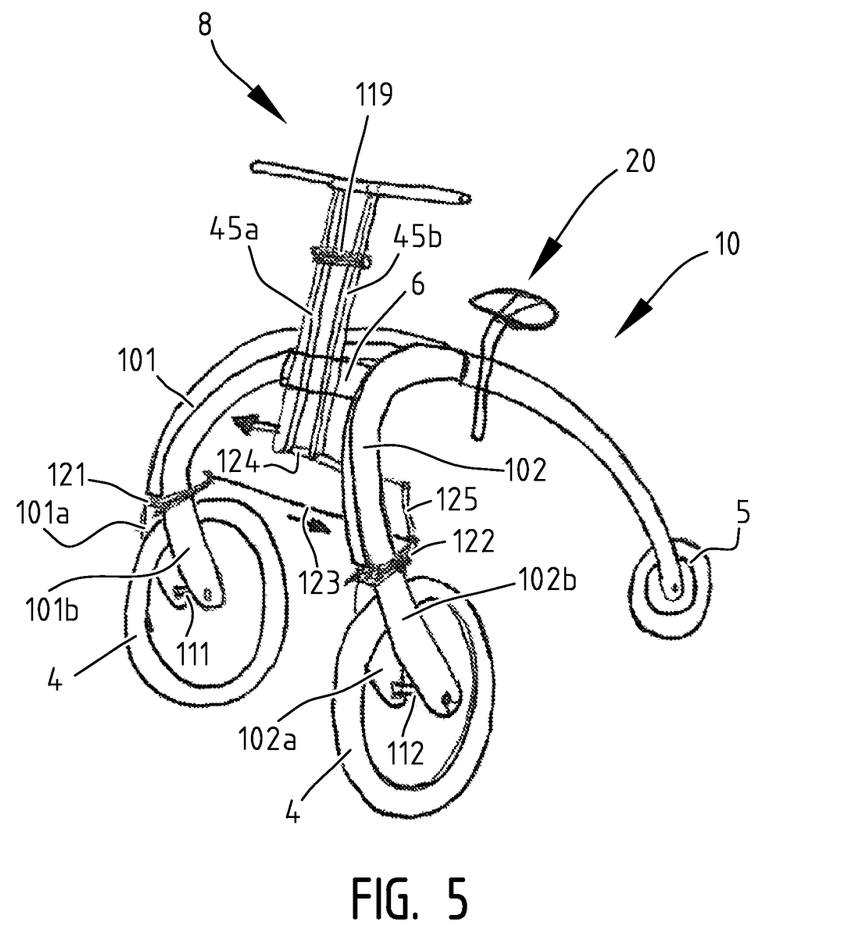
FIG. 5 is a perspective view of a third embodiment of the walker device, with an alternative frame structure.

A third embodiment is shown in FIG. 5. This third embodiment differs from the second embodiment in FIG. 4 with respect to the construction of the fore frame part 2*a*, and in relation to the steering mechanism. The walker of this embodiment has an overarching frame 10 with a first and a second frame element 101, 102 at its front side. The frame elements 101, 102 are coupled with a connecting rod 6, which is located in this embodiment close to the top of the overarching frame 10. The resulting construction is very simple. Moreover, in this embodiment, the frame elements 101, 102 effectively extend to the front wheels 4, and hold the wheels in a fork-shaped extension: the first frame element 101 extends to the first front wheel with an extension having fork elements 101*a*, 101*b*, wherein the wheel is connected thereto by means of shaft 111. Similarly, the second frame element 102 extends to the second front wheel, extending into a fork with fork elements 102*a*, 102*b*, wherein the wheel is connected thereto by means of shaft 112.

The steering mechanism of the third embodiment is a so-called swivel steering mechanism. Key elements are the bearings 121, 122 which are present between the first and second frame elements 101, 102 on the one hand and the fork-shaped extensions thereto (101*a*, 101*b*, 102*a*, 102*b*) on the other hand. These bearings 121, 122 allow a rotation of the wheels relative to said frame elements 101, 102. In a more specific implementation as shown in this FIG. 5, the rotation of the bearings 121, 122 is governed via a plurality of shafts and rods 45*a*, 45*b*, 124, 125, 123. When the steering bar 8 is pushed to the right side (in the figure), the shafts 45*a*, 45*b*, will rotate relative to the connecting rod 6. A lower end of the shafts 45*a*, 45*b* coupled to rod 124 is therewith moved in the opposite direction, i.e. the left side (see the arrow). Shaft 125 will then rotate around its center, such that its bottom side goes again to the right side. Correspondingly, the rod 123 will move to the right side, resulting in rotation of the bearings 121, 122. Pin 119 further ensures that the shaft 45*a*, 45*b* is limited to a rotation within the plane of the shafts 45*a*, 45*b* and the connecting rod 6.

Figure 6:
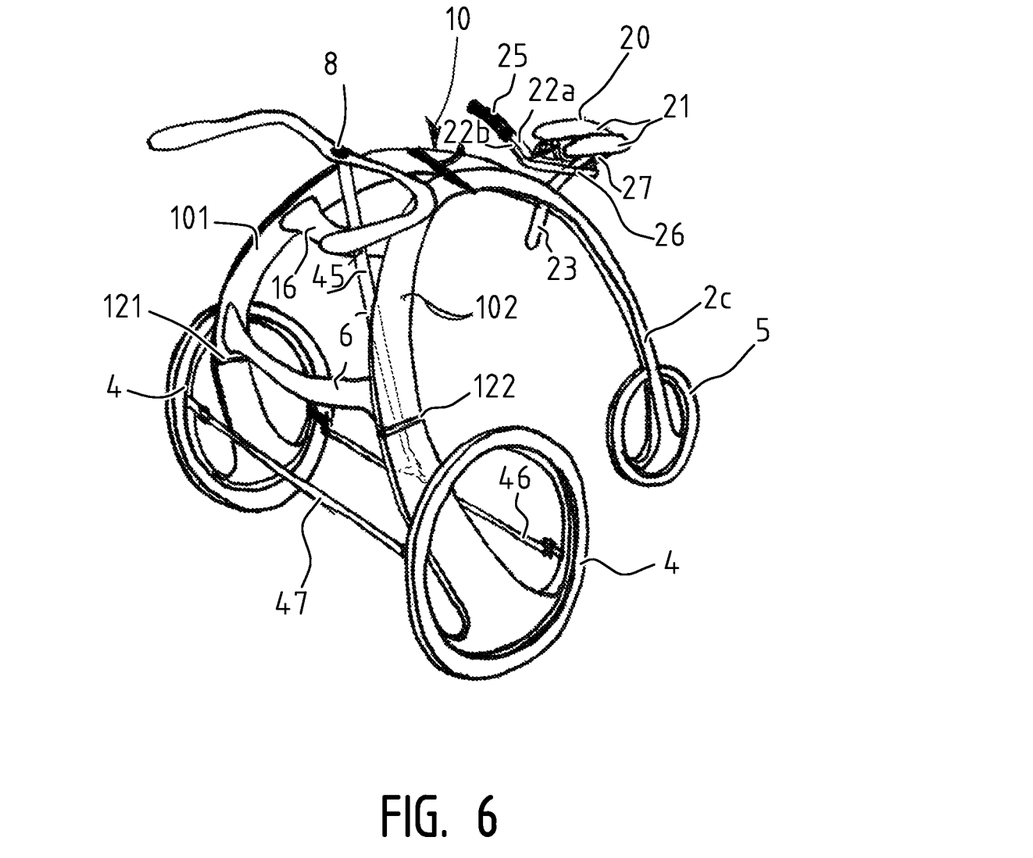
FIG. 6 shows a fourth embodiment of the walker device.

Again a further embodiment is shown in FIG. 6. This embodiment is similar to the third embodiment of FIG. 5, in that it has a first and a second frame element 101, 102, splitting up at or near the top of the overarching frame.

The frame elements 101, 102 are mutually coupled with a connecting rod 6 and with an auxiliary connecting rod 16.

The steering mechanism of this embodiment comprises a steering bar 8 that is coupled via a shaft 45 and a connecting rod 46 to the wheels. Just above the front wheels 4, the frame elements 101, 102 are interrupted by a horizontal bearing 121, 122, which allow the wheels 4 to turn independently of the frame 10. The front wheels 4 are higher than the rear wheel 5, such that the center of the front wheels 4 is higher than for example a curbstone. This makes the transition from sidewalk to street and back to the sidewalk easier for the user. The front wheels are for instance 10" (25 cm) diameter or larger.

The walker device of this embodiment can be equipped with swivel/rotating wheels (castors, like on shopping carts but then larger) in the front, which enables easy manoeuvring, or in the more specialized version, be equipped with a complete steering mechanism, whereby both front wheels remain connected to the frame as is, but can each rotate as determined by the swiveling steering handle bar 8, that through the steering house or shaft 45 connects the wheels 4 with the horizontal, parallel steering mechanism 46, 47.

The steering of the Walker device in the embodiment of FIG. 6 is designed for an intuitive way of moving. When the user wants to go right, the user "leans" the steer 8 to the right. The rolling point of the wheels is off centre, but not at the lowest point. The horizontal steering bar 8 is mounted on top of the vertical steering house or shaft 45 with an adjustable tightening bolt. The vertical steering house is hinged on the top frame, auxiliary connector 16. such that when the steering bar 8 is pushed to the right, the bottom part of the steering house or shaft 45 swivels to the right. The bottom of the steering house is connected to the horizontal connectors 46, 47 between the front wheels 4. The front wheels may be spoke-less wheels. The roller on the bottom of the fork of the frame is attached to the inner rim, the outer rim runs through the roller. This way the gravity point is low, but the larger wheel allows to go over larger obstacles like curbs. However it can also be equipped with regular wheels.

The brake mechanism is based on safety and easy to use for people with limited fine motor in their hands, in a suitable embodiment. When leaning on the steering bar 8 forward, the roller on the wheels 4, start touching the outer rim of the wheels. That friction slows it down. The more weight you put forward the harder it brakes.

Alternatively, when equipped with regular wheels, the brake activates similarly by moving the steering bar forward. When an older person is tired, or panics, it just leans forward and comes to a standstill. For parking the walker device, the rear wheel suitably has a stationary brake. Hence, it can be locked so the person can walk off the Walker device and transition to a seat, then swing the Walker out of the way.

Further is shown in FIGS. 1, 2 and 4 that the fore frame part 2*a* is higher than the rear frame part 2*c* to provide maximum legroom for a walking movement by the user. Hereby, damaging of the legs by collision with the walking device 1 is avoided.

Supporting and steering is further provided by support element 8 at the front side, which support element may be gripped by a user with his or her hands. The support element 8 comprises a substantially horizontal steering bar mounted on a rotating wheel transferring the steering action via the cables to the wheels.

Alternative swivel steering for special users has a substantially vertical swivel steering mechanisms suitable to actuate the at least two transversal arranged front wheels.

The FIGS. 1, 2 and 4 further show that the at least two front wheels 4 have a larger diameter than the first rear wheel 5, thereby providing a safe drive without being stopped by small obstacles.

Figure 3B:
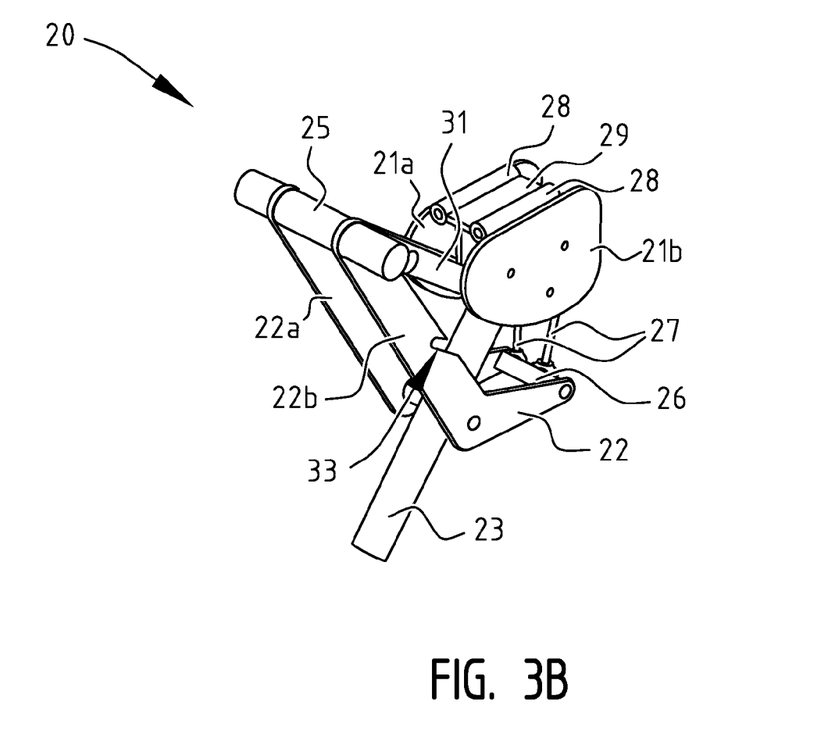

Referring now to FIG. 3, FIGS. 3A and 3B show a sitting assembly 20 according to the present invention, provided with a saddle 21 having a first and a second saddle pad 21*a*, 21*b*. Rather than two saddle pad 21*a*, 21*b*, one saddle pad could be present, which suitably hinges upwards at the rear side. Three saddle pads, or other options are not excluded.

The saddle pads 21*a*, 21*b* are rotatable fixed to a supporting element or top structure 29, which is connected to a saddle pin 23 of the sitting assembly 20. With this saddle pin 23, the sitting assembly 20 is connected to the overarching frame 2. The rotatable fixation is for instance a hinge 28 and allows that each saddle pad 21*a*, 21*b* is moved from a substantially vertical position to a substantially horizontal position, or vice versa. This occurs when the sitting assembly is brought from its first state to its second state.

The sitting assembly 20 is further provided with a hinging mechanism, according to which a lever construction 22 rotates around or hinges on an axis located on the lever, for instance halfway, or more generally at a position between 30% and 70% of the lever length. This axis is embodied in an element, which extends through or is directly connected to the saddle pin 23. The end of the lever construction 22 is coupled to extenders 27 to the bottom side of saddle pad portions 21*a*, 21*b*. Thus, when the lever 22 is pushed downward, particularly at its haft 25, the opposite end of the lever 22 goes upward. The extenders 27 then go upward and outwards to bring the saddle pads from a substantially vertical position to a substantially horizontal position.

In order to fix the saddle pads in their latter position, a lock is provided. This lock is a mechanical lock in the embodiment shown in FIG. 3 and comprises an arm 31 with a locking pin 32. Upon transition from the first to the second state, the locking pin 32 glides downwards along a surface of the lever 22. It ultimately arrives at a locking cavity 33, into which it falls, thus locking the sitting assembly. By pushing the haft 25 of the lever 22 further downwards, or pulling arm 31 upwards, the saddle unlocks. Saddle pads 21*a* and 21*b* return to the first state and the user can easily dismount.

In order to have a most effective use, the lever 22 comprises in this embodiment a first and a second lever arm, that are mutually angled at or near the saddle pin. Thereto, they mutually include an angle of 90-180 degrees, preferably 120-150 degrees. This two-arm construction enables that the haft 25 of the lever 22 is sufficiently upwards in the first state. This allows an easy and forceful grip of a user. The lever construction is furthermore provided with a left lever rod 22*a* and a right lever rod 22*b*. This double construction is deemed beneficial from constructional point of view. It moreover easily allows that the saddle pin 23 extends between the left and right lever rod 22*a*, 22*b*.

In the shown embodiment, the lever rods 22*a*, 22*b* are mutually connected at an end through a rod-end connector 26. Extenders 27 connected to said rod-end connector 26 extend under the saddle pads 21*a*, 21*b*. The connection point of the levers 22*a*, 22*b* and the connector 26 and the extenders 27 move upwards when bringing the sitting assembly from the first state to the second state. The extenders 27 also move outwards, so that they each end up near to the bottom and suitably an edge of a saddle pads 21*a*, 21*b* and provide optimum support. Thereto, these extenders 27 are suitably provided behind the lever rods 22*a*, 22*b*.

The operation is as follows:

In FIG. 3B the sitting assembly is shown in its first state with the saddle 21 folded or at least not obstructing movement of a user. The saddle comprises in this embodiment saddle pads 21*a*, 21*b*, which are hanging down in the first state. A user may get onto the vehicle and above the saddle pads 21*a*, 21*b*. Subsequently, the user may bring the sitting assembly into the second state, wherein the saddle pads 21*a*, 21*b* extend substantially horizontal or even slightly upwards, as shown in FIG. 3A. This is done by using the lever 22, for instance the haft 25 thereof. In this second state the saddle 21 is locked. Particularly, when pushing the lever mechanism down, the lock comes down and locks the lever into place once the saddle has come to full extension. Upon dismounting from the saddle pad (i.e. leaving the vehicle), the lever can be 'unlocked' by pulling the arm 31 up, out of the "lock" position. Automatically, this will lower the saddle pads and elevate the lever 22, allowing easy dismounting. More specifically, in the shown implementation, the lock is effectively a locking lever arm 31 gliding downwards along a surface of the levers 22*a*, 22*b*, when the lever haft 25 is pushed downwards by a user. A pin 32 of the locking lever arm 31 then falls into a cavity 33 in the levers 22*a*, 22*b*. This constitutes the lock. The locking lever arm 31 is suitably connected with its opposite end at a hinge in the saddle assembly, for instance a rod between ends of the levers 22*a*, 22*b*.

Pads are exchangeable and can be custom fitted for various users. The pads are separately mounted on and snapped in place in the two hinging plates of the saddle mechanism.

While the shown embodiment comprises a left lever 22*a* and a right lever 22*b*, this could alternatively be implemented with a single lever. A connecting rod is then not necessary, and the extenders 27 could be connected to the lever 22 directly.

FIGS. 1 and 4 moreover show a second embodiment of the sitting assembly. Herein, the haft 25 is connected to the lever arm 31 via shaft 36 and coupled via rotatable wires 35 to an end of the lever 22. This embodiment has the advantage that a user can with a single haft 25 operate the lever 22 and ensure locking and particularly delocking of the locking pin 32. A further feature of this second embodiment is the replacement of the locking cavity 33 with a protrusion 34. When bringing the lever 22 downwards for a transition from the first state to the second state, the locking pin 32 will glide on the surface of the lever 22 and pass over the protrusion 34, so as to become locked. A cavity could be made, but does not appear necessary. It appears that the dimensions of the locking arm 31 and the lever 22, as well as the location of the protrusion 34 anyhow fix the position of the locking pin 32 in the said locking position.

In summary, the present invention provides a walker device comprising an overarching frame with an overarching top, and a sitting assembly coupled to said frame, which frame extends at least primarily in a first direction between a front side with at least two front wheels and a rear side with a first rear wheel. The frame has a rear frame part and a middle frame part. The rear frame part has a height allowing a user to walk over the rear frame part and take place on the sitting assembly. The middle frame part has a width allowing a user to place his or her legs on either side of the middle frame part. The sitting assembly suitably comprises a hinge with a saddle, preferably comprising a first and a second saddle pad for a transition between a first state and a second state.

The invention claimed is:
1. Walker device comprising:
an overarching frame including an overarching top; and
a sitting assembly coupled to said overarching frame,
the overarching frame extending at least primarily in a first direction between a front side including at least two front wheels and a rear side including a first rear wheel, the at least two front wheels including a left front wheel and a right front wheel and including a relatively larger diameter than the first rear wheel,
the overarching frame including an arched shape, when viewed in a side view parallel to the first direction,
the overarching frame comprising, when viewed along the first direction,
a fore frame part located before said overarching top,
a middle frame part located between said overarching top and the sitting assembly, and
a rear frame part located behind the sitting assembly, to which the rear wheel is connected, wherein the overarching frame is free of any additional connection between the rear frame part and the fore frame part, the rear frame part including
a height allowing a user to walk over the rear frame part and sit on the sitting assembly, extending towards a lower end at which said rear wheel is located, and
an extension wherein, in use, the first wheel is located behind the body of the user;
the middle frame part including a width allowing a user to place his or her legs on either side of the middle frame part and being relatively higher than the rear frame part to provide legroom for a walking movement by the user, and
the sitting assembly being coupled to the overarching frame with a saddle pin, which extends backwards in space.
2. Walker device according to claim 1, wherein the fore frame part has a width relatively larger than the middle frame part.
3. Walker device according to claim 1, wherein the fore frame part comprises a first and a second frame element, wherein the first frame element extends from the middle frame part towards a left front wheel, and wherein the second frame element extends from the rear middle frame part towards a right front wheel.
4. Walker device according to claim 1, wherein the overarching frame, when viewed in a perpendicular top view, includes or encloses a substantially triangular shape, wherein its width relatively increases from the first rear wheel to the at least two front wheels.
5. Walker device according to claim 1, wherein the fore frame part is connected with the at least two front wheels via a transversal rod which extends between the at least two front wheels.
6. Walker device according to claim 1, further comprising a support element at the front side, grippable by a user with his or her hands.
7. Walker device as claimed in claim 6, wherein the support element extends from the overarching top and comprises a steering bar.
8. Walker device according to claim 6, wherein the support element comprises a substantially horizontal steering bar mounted on a substantially vertical swivel steering mechanisms suitable to actuate the at least two transversal arranged front wheels.
9. Walker device according to claim 1, wherein the middle part comprises a hinge for folding the frame.
10. Walker device according to claim 1, wherein a saddle pad of the sitting assembly is at a height substantially equal to or lower than the overarching top.
11. Walker device according to claim 1, wherein the saddle pin extends at least largely perpendicular from the overarching frame.
12. Walker device according to claim 1, wherein the sitting assembly is provided with a saddle coupled to a hinging unit configured to bring the saddle from a first state to a second state, wherein, in the first state, a user may get onto the vehicle and above the saddle, and wherein, in the second state, the saddle pad is locked and in a position to support the user.
13. Walker device according to claim 12, wherein the saddle comprises two saddle pads, suitable for supporting a buttocks of the user, and wherein upon transition from the first state to the second state, each of the two saddle pads is brought from an orientation, in which the two saddle pads hang down, to a substantially horizontal orientation.
14. Walker device according to claim 5, wherein the transversal rod is a horizontal rod.
15. Walker device according to claim 14, wherein the overarching frame further comprises supporting connector elements between the transversal rod and the fore frame part.
16. Walker device comprising:
an overarching frame including an overarching top; and
a sitting assembly coupled to said overarching frame, the overarching frame extending at least primarily in a first direction between a front side including at least two front wheels and a rear side including a first rear wheel, the overarching frame including, when viewed along a first direction,
a fore frame part located before said overarching top,
a middle frame part located between said overarching top and the sitting assembly, and
a rear frame part located behind the sitting assembly to which the rear wheel is connected,
wherein the rear frame part includes a height allowing a user to walk over the rear frame part and sit on the sitting assembly,
wherein the middle frame part includes a width allowing a user to place his or her legs on either side of the middle frame part, and wherein the sitting assembly is coupled to the overarching frame with a saddle pin, which extends backwards in space.

17. Walker device according to claim 16, wherein the fore frame part has a width larger than the middle frame part.

* * * * *